D. DENEEN.
ATTACHMENT FOR MIDDLINGS PURIFIERS.
APPLICATION FILED APR. 15, 1907.
912,649.
Patented Feb. 16, 1909.
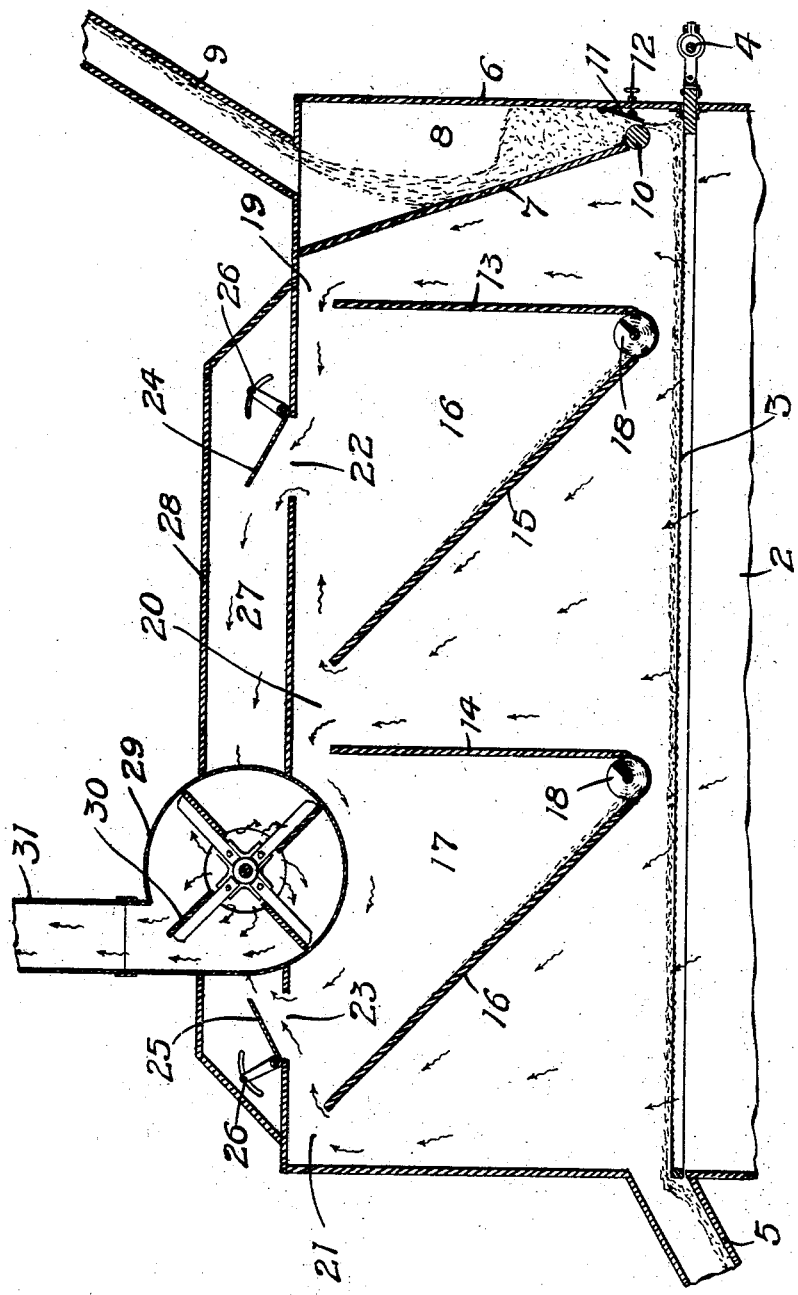
WITNESSES
INVENTOR
DENNIS DENEEN
BY
HIS ATTORNEYS

UNITED STATES PATENT OFFICE.

DENNIS DENEEN, OF GLENCOE, MINNESOTA.

ATTACHMENT FOR MIDDLINGS-PURIFIERS.

No. 912,649.   Specification of Letters Patent.   Patented Feb. 16, 1909.

Application filed April 15, 1907. Serial No. 368,418.

*To all whom it may concern:*

Be it known that I, DENNIS DENEEN, of Glencoe, McLeod county, Minnesota, have invented certain new and useful Improvements in Attachments for Middlings-Purifiers, of which the following is a specification.

The object of my invention is to provide an apparatus by means of which the dust and fine material may be lifted out of the middling stock and graded and discharged from the machine without danger of becoming again mixed with the stock or deposited upon the sieve.
The invention consists generally in various constructions and combinations, all as hereinafter described and particularly pointed out in the claims.

In the accompanying drawings, forming part of this specification, the figure represents a longitudinal vertical sectional view of a middlings purifier attachment embodying my invention.

In the drawing, 2 represents the upper portion of a middlings purifier having the usual horizontal reciprocating sieve 3 operated in the usual way from the shaft 4 and composed of meshes of different degrees of fineness for the purpose of grading the middlings as usual in a machine of this type. A spout 5 is provided at one end of the machine into which the tailings or shorts from the sieve are discharged. Above the casing 2 and supported thereon, is a casing 6 wherein the apparatus embodying my invention is arranged, and which I will now proceed to describe in detail. A plate 7 is provided in one end of said casing extending from the top thereof and converging toward one end to form a hopper 8 into which the material is discharged from the break machines through a spout 9. A feed roll 10 is provided at the lower edge of the plate 7 and a hinged valve 11 operated by a stem and handle device 12 enables the operator to increase or decrease the feed opening at the bottom of the hopper in the usual way. The material from the hopper falls upon the receiving end of the sieve 3 and is gradually worked along thereover by the reciprocation of the sieve.

Within the chamber formed by the casing 6 I provide upright plates 13 and 14 spaced from the sieve and from the top of the casing. Inclined plates 15 and 16 are also provided and also spaced from the sieve and the top of the casing, and converging toward the lower edges of the plates 13 and forming chambers 16 and 17 which are open at the top and closed at the bottom between the inclined and upright plates by means of horizontal conveyers 18 which receive the material from the chambers and deliver it outside of said casing. These conveyers are operated in any suitable way, which it is not necessary to illustrate herein.

The spaces between the plates 7 and 13, 14 and 15 and the end wall of the casing and the plate 16, gradually contract toward the top of the casing owing to the arrangement of the plates, until at the upper edges of said plates a series of narrow throats 19, 20 and 21 are formed, and the currents of air drawn up through the sieve and into the spaces between the chambers will, as they approach the throats, be contracted and will increase in force as they pass through the narrow throats and through the space between the upper edges of the walls of the chambers and the top of the casing. The top of the casing has openings 22 and 23 therein provided with valves 24 and 25 having adjusting devices 26 by means of which the valves may be set in any desired position to increase or decrease the size of the openings. An air trunk 27 is formed by the casing 28 above the chambers and over the openings 22 and 23, and a casing 29 incloses a suction fan 30 located between the openings 22 and 23 and communicating through the air trunk with the interior of the casing 6. This fan is driven by any suitable means and has a spout 31 leading to a dust chamber, not shown.

In the operation of the machine currents of air will be established through the sieve and the material thereon of sufficient strength to lift the dust and finer particles up into the spaces between the walls of the chambers 16 and 17 and as the air currents pass through the throats between said walls and flow over the open tops of the chambers the heavier particles will be precipitated by gravity into the chambers and the conveyers therein and be discharged out of the machine. The successive chambers will have the effect of grading the material, one chamber catching the coarser grade of the particles suspended in the air currents, while the next chamber will receive the material that was carried by the air currents over the first chamber. The dust will be carried along through the fan to the dust chamber. By means of the valves leading to the air trunk the suction of the fan can be regulated according to the character of the material that is passing through the machine and the degree of separation desired.

With this apparatus the material lifted by the air currents from the middlings can be graded very successfully and thoroughly and discharged from the machine, and there will be no possibility of the separated material or dust becoming again mixed with the purified stock.

I claim as my invention:

1. In a middlings purifier, the combination, with a reciprocating sieve, of a casing supported above the same, upright plates arranged transversely in said casing, inclined plates also arranged transversely in said casing and converging at the bottom toward the lower edges of said upright plates, and said upright plates and inclined plates being spaced from the top of said casing and from said sieve, and narrow throats or passages being formed between said plates and the top of said casing and extending continuously over said plates, transverse conveyers provided in the space between the lower edges of said upright and said inclined plates, and air passages being formed between said inclined plates and the contiguous upright plates, said passages gradually contracting and forming throats between the upper edges of the contiguous plates near the top of the casing, and chambers with open tops being formed between said plates intermediate to said throats or passages, and the top of said casing having openings above said chambers, and valves therefor, and a suction fan having a trunk communicating with said opening and whereby currents of air will be established up through said throats and across the open tops of said chambers and into said fan through said openings, for the purpose specified.

2. In the middlings purifier, the combination, with a casing, of a reciprocating sieve supported therein, vertically arranged plates 13 and 14 extending transversely at intervals in said casing above said sieve, inclined plates 15 and 16 having their lower edges near the corresponding edges of said vertical plates and diverging therefrom toward the top of the casing and forming settling chambers, transverse conveyers arranged between the lower edges of said plates in the bottom of said settling chambers, the upper edges of said vertical and inclined plates being separated from the top of said casing by narrow horizontal throats or passages which extend continuously over said chambers, and a narrow vertical throat or passage being formed between said chambers and communicating with the space above said sieve and with said horizontal throats, and the top of said casing having openings over said chambers and horizontal throats and communicating therewith, a single unobstructed horizontal air trunk mounted on said casing and communicating with said openings, and a fan arranged to draw currents of air through the openings in the top of said casing, the currents of air established by said fan passing up through said sieve and said vertical throats and through said horizontal throats and across said chambers, the heavier particles being precipitated into the chambers and the finer material passing up through said openings into said air trunk.

In witness whereof, I have hereunto set my hand this 10th day of April 1907.

DENNIS DENEEN.

Witnesses:
RICHARD PAUL,
J. B. ERA.